(12) United States Patent
Dimitroff et al.

(10) Patent No.: US 7,379,960 B2
(45) Date of Patent: May 27, 2008

(54) SYSTEM AND METHOD FOR MANAGING DATA FLOW AND MEASURING SERVICE IN A STORAGE NETWORK

(75) Inventors: John Dimitroff, Houston, TX (US); Minh Chau Alvin Nguyen, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 683 days.

(21) Appl. No.: 10/748,346

(22) Filed: Dec. 29, 2003

(65) Prior Publication Data

US 2004/0143660 A1 Jul. 22, 2004

Related U.S. Application Data

(63) Continuation of application No. 09/589,778, filed on Jun. 8, 2000, now Pat. No. 6,742,020.

(51) Int. Cl.
*G06F 15/16* (2006.01)

(52) U.S. Cl. .............. 709/202; 709/217; 709/226

(58) Field of Classification Search ............ 709/217, 709/226, 202
See application file for complete search history.

(56) References Cited

U.S. PATENT DOCUMENTS

| | | | | |
|---|---|---|---|---|
| 6,151,624 | A * | 11/2000 | Teare et al. | 709/217 |
| 6,460,082 | B1 * | 10/2002 | Lumelsky et al. | 709/226 |
| 6,493,720 | B1 * | 12/2002 | Chu et al. | 707/104.1 |
| 6,650,620 | B1 * | 11/2003 | Neogi | 370/231 |
| 6,678,700 | B1 * | 1/2004 | Moore et al. | 709/201 |
| 2003/0046396 | A1 * | 3/2003 | Richter et al. | 709/226 |
| 2005/0160154 | A1 * | 7/2005 | Raciborski et al. | 709/219 |

\* cited by examiner

*Primary Examiner*—Phuoc H Nguyen

(57) ABSTRACT

A computer network has several machines, including machines having storage systems, and communication resources for communicating between the machines. A metadata registry having information about data stored on the network is distributed on two or more machines of the network, and local copies of part of this metadata registry reside on a compute machine of the network. The metadata registry has a command object that comprises network address information about at least some of the machines of the computer network that participate in a first communication. An agent monitors communications between the machines of the computer network for communications relevant to the command object, the agent modifies the command object by adding network address information of additional machines of the computer network that should participate in the first communication between said machines to maintain coherency of the metadata registry and local copies thereof.

11 Claims, 12 Drawing Sheets

SYSTEM AND METHOD FOR MANAGING DATA FLOW AND MEASURING SERVICE IN A STORAGE NETWORK

RELATED APPLICATIONS

This application is a continuation of U.S. patent application Ser. No. 09/589,778, filed Jun. 8, 2000 now U.S. Pat. No. 6,742,020.

TECHNICAL FIELD OF THE INVENTION

This invention relates in general to distributed computing systems including storage networks and, more specifically, to systems and methods for measuring and managing the flow of data in distributed computing systems and storage networks.

BACKGROUND OF THE INVENTION

Distributed computing systems generally include two or more computers that share data over a decentralized network. Examples of such systems include Automatic Teller Machine (ATM) transaction-processing networks, airline reservation networks, and credit card transaction-processing networks.

Storage networks are a subset of distributed computing systems in which the network resources used for communication between storage resources and computation resources are separate from the network resources used for general network communications. The storage area network is an attempt at providing increased storage performance through the separation of storage related traffic from general network communications. This allows general communications to go on without being blocked by data/storage traffic, and conversely allows data/storage traffic to occur without interruptions from general network communications.

In distributed storage systems, there is need to store both data and metadata. Metadata is information about data being stored, like size, location, and ownership. Even simple filesystems store metadata in their directory structures.

In a distributed computing system or storage network, it is desirable that data be accessible, even if a single machine of the system fails. It is also desirable that data be stored and delivered to machines of the system in ways that overcome the differences between various machines and operating systems. It is desirable that system performance be high, and further, that adding machines to the system increase both performance and storage capacity—that the system be scalable. Data should be maintained in a secure manner, with strict control over device access, and the system should be easily managed.

In distributed computing systems and storage networks, there may be multiple copies of at least some data and metadata existing in multiple machines simultaneously. Coherency requires that these copies be identical, or interlocked such that only the most recently altered version is subject to further modification. It desirable that data, and especially metadata, be stored and access interlocked to enforce coherency in the multiple machines of the system to prevent such faux-pas as assigning a single airline seat to two different passengers.

In particular, it is desirable that users, and user-level applications, not need to track and select storage devices and partitions thereon. Users or application programs should be able to specify storage and performance requirements for data to be stored, allowing the storage subsystem to select the physical device. These performance requirements for specific data are quality of service (QOS) metrics. Further, the system should ensure that QOS requirements are met insofar as possible.

Various methods have been devised for managing data flow in distributed computing systems. For example, U.S. Pat. No. 5,724,575 to Hoover et al. describes a system for managing data flow in a distributed, heterogeneous health care computing system. In the Hoover system, individual heterogeneous computers make their data homogeneous by mapping their heterogeneous data fields to a homogeneous object model through an interface server. The flow of homogeneous data to and from the individual computers is then managed by a central object broker computer capable of managing data presented in accordance with the object model. This approach may suffer if the central object broker or interface server becomes overloaded or fails; data is then inaccessible even if physically located on a functioning machine.

Other methods for enabling data flow in distributed computing systems are disclosed in U.S. Pat. Nos. 5,758,333, 5,675,802, 5,655,154, and 5,412,772. In U.S. Pat. No. 5,675,802 a system for managing distributed software development projects has multiple, "weakly consistent," copies of a source code database at multiple locations. A "mastership enforcer" at each location enforces access-for-change limitation rules to files of the source-code database. Periodically the "weakly consistent" copies are synchronized, such that updated copies replace outdated copies in other locations.

In U.S. Pat. No. 5,412,772, an object format for operation under several different operating system environments is described. This object format includes view format information for each object that incorporates information that may be accessible under only one or another of the operating system environments. The object format of U.S. Pat. No. 5,412,772 is described without reference to a locking or other data coherency enforcement mechanism.

U.S. Pat. No. 5,758,333 describes an application-independent database system having a central access control system, a central storage system, and a central These methods appear to be limited to application in a homogenous distributed computing system, are limited to point-to-point data transactions, or fail to provide the high level of data coherency required for such applications as air travel reservation transaction processing.

It is known that there are systems on the market that provide at least partial solutions to the problems of managing and measuring data flow in distributed computing systems and storage network systems. These systems include Sun JIRO—which is documented on the Internet at www.jiro.com. Sun's device and data management services. The data services portion of Jiro does not manage the network interconnect to control data flow. This could limit performance and ability to operate in a truly heterogeneous environment with non-StoreX devices.

Accordingly, there is a need in the art for an improved system and method for managing data flow in a distributed computing system.

SOLUTION TO THE PROBLEM

A distributed computing system implements a shared-memory model of storage on a network. The network may be a storage area network. The shared memory model contains a distributed metadata database, or registry, that provides a coherent and consistent image of the state of data activity, including data storage, movement and execution, across the storage network. Upon the same network, but not necessarily in the same machines of the network, is a distributed data database controlled and indexed by the distributed metadata registry.

The metadata registry is implemented to provide data availability, reliability, scalability of the system, compatibility, and simplicity of management. The metadata registry also contains information about available resources of the system, including quality-of-service (QOS) metrics of each available resource, and information about transactions in progress over the network. The information about transactions in progress is stored in command objects of the metadata registry.

The shared-memory model is implemented on top of a network infrastructure and under the file system and operating system—it acts as an abstraction layer that masks the out differences between the hardware and software platforms. This allows incorporation of new technologies without redesign of an entire system.

In order to ensure coherency between multiple copies of sections of the distributed metadata registry, an agent may be injected onto a switch of a storage network, onto a router of a general network, or maintained on a system on which a section of the metadata registry is stored. This agent monitors communications between machines that write metadata and machines on which a section of the metadata registry is stored for creation of write command objects. When a write command object is created, the agent adds additional destination machines to the write command object such that those machines will be updated when the write command executes.

Command objects ready for execution are evaluated for potential dependencies and order-specific execution requirements. Those without potential conflicts or order-specific flags, as well as those whose potential conflicts have cleared or are the earliest pending in order-specific sequences, are executed. Command objects having incomplete potential dependencies may, but need not, be executed speculatively.

A machine of a network in accordance with this invention includes an application programming interface (API) that receives generic input/output (I/O) commands and database commands from a software thread of an application. Code associated with the API converts the generic I/O commands received from the software thread to I/O commands specific to the metadata registry and data operations. The converted I/O commands are forwarded to machines storing the metadata and data for translation to I/O commands for individual storage devices. An object registry provides database services in response to the database commands received from the software thread.

In another embodiment of this invention, a data transaction in a distributed computing system is managed by generating a data structure, or command object, for the data transaction within the metadata registry maintained in the shared-memory model. The data structure includes a plurality of objects that describe the parameters of the data transaction. IDs unique within the distributed computing system are generated for at least some of the objects, and the data transaction is added to a list of pending transactions within the registry. The transaction-related objects are then associated with one another through links, and a command is generated to initiate the transaction.

In an embodiment of the invention, an allocation process handles requests for allocation of storage resources to a software thread of an application or to data to be stored in the system. The requester may specify a specific resource, or may specify desired QOS attributes of the resource. If the requester specifies a specific resource, the allocation process allocates that resource if it is available. If the requester specifies desired QOS attributes, the allocation process searches the metadata registry for suitable resources meeting the QOS requirements. The QOS requirements may include specifications of search engines or other processing power of a machine to which the resource is attached, as well as interface specifications of the resource to that machine. The QOS requirements are stored in the metadata registry along with information regarding the data, including the actual physical location of the data.

Each machine having data monitors the actual quality of service it provides to user and application programs running in the system. There is a dynamic load-balancing process that periodically examines data to identify data for which the QOS requirements have not been met, for which the QOS requirements have been greatly exceeded, or that may soon overflow a resource. This process then moves that data to more optimum locations in the network. Movement of data to more optimum locations may involve movement to resources having a different QOS, or closer proximity to machines on which the user and application programs are run.

System management utilities may also examine and alter the QOS requirements for specific data of the system so as to permit optimization of problem user and application programs run in the system.

The combination of the automatic resource allocation process and the load-balancing process together provide a utility-style operation, where storage requests need not specify physical locations in the network, and where problem data migrates to the best available resource in the system.

In another embodiment of the invention, when data or metadata of the system is searched for desired information, an inquiry is made of the machines on which the information may be located to determine if those machines have application-specific executable code, such as search code for locating desired information. If that machine lacks the application-specific executable code, the requesting application transmits the application-specific executable code to the machines on which the information may be located. The application-specific executable code is then executed on the machines on which the information may be located; and those machines return appropriate responses. Operation in this manner minimizes data transfer over the network during search operations.

DETAILED DESCRIPTION

Figure 1:
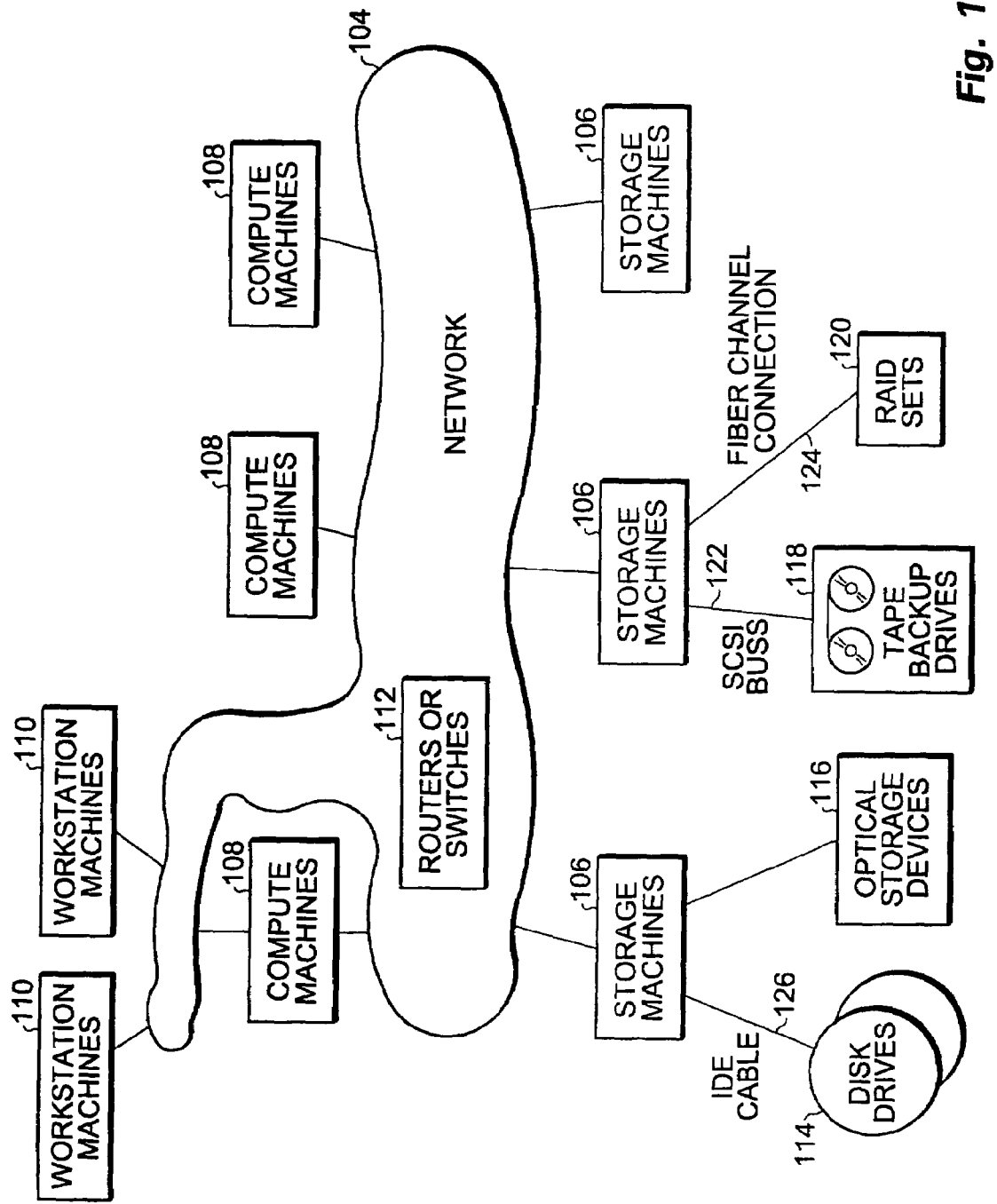
FIG. 1 is a block diagram showing a distributed computing system in accordance with this invention.

As shown in FIG. 1, a distributed computing system in accordance with this invention includes multiple computing machines interconnected via a network 104. Some machines of the system are storage machines 106 that primarily function to serve storage resources to other machines of the network. Other machines of the system are compute machines 108 that primarily serve as computation resources that use storage served by storage machines 106. There may also be workstation machines 110 that interact with the compute machines 108. It will be understood by those having skill in the technical field of this invention that the invention is not limited to any particular distributed computing system, computing device, or network. The storage machines 106 may, but need not, be RAID storage systems. The network may, and usually does, incorporate one or more routers or switches 112 as well as communications links of the kinds known in the art. Machines of the distributed computing system may be single or multiple processor machines, of general purpose or of dedicated purpose as known in the art.

In the art of networking a device for communicating packets between machines, including compute machines 108 and storage machines 106, over communication resources that may vary with the identity of the machines and the availability of communication resources is known as a router. In the art of storage area networks, similar devices for communicating packets between machines is known as a switch. For consistency, both devices are called switches herein.

The network may have the form of a storage area network, where separate physical network hardware is utilized for most storage-related communications, including metadata communications. This technique avoids conflict between storage-related communications and workstation-compute machine communications.

Attached to storage machines 106 of the system are storage resources, such as disk drives 114, optical storage devices 116, tape backup drives 118, RAID sets 120, or other storage devices as known in the art of computing. Interconnections between storage resources and storage machines may have the form of a SCSI buss 122, a fiberchannel connection 124, an IDE cable 126, or such other interfaces as are or may become known in the art of computing.

A compute machine 108 of the distributed computing system of FIG. 1 has one or more threads 200 of an application program, which may be a program for accessing a database, or any other program that requires access to data stored on the distributed computing system. This thread communicates to an application programming interface (API) module 202 also executing on the compute machine. When the API starts, it locates a root, or copy thereof, of a metadata registry (see below) that exists on the system, copies it, and maintains a local copy 204 of at least some parts of the metadata registry. The metadata registry has a tree structure, so once the root is located, links of the tree can be followed to locate all other elements of the registry.

The local copy 204 of portions of the metadata registry contains information 206 about data stored on the system that the compute machine 108 has need to access, information 208 on pending and executing commands involving data relevant to compute machine 108, and any information 210 on resources 212 served to other machines of the system by compute machine 108. The API 202 communicates through a network interface module 214 onto the network of the system.

Figure 2:
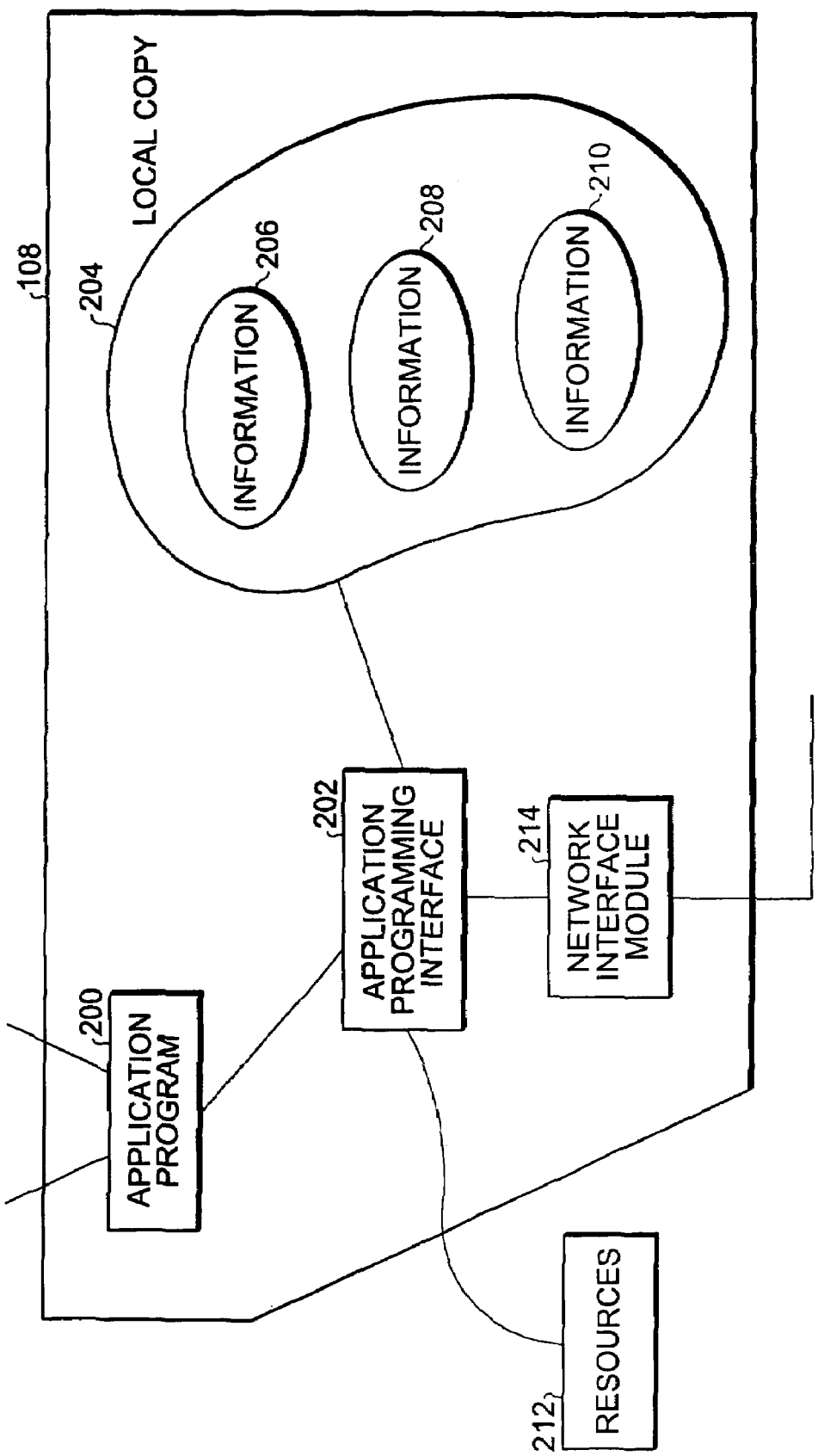
FIG. 2 a block diagram illustrating processes and data on a compute machine from the distributed computing system of FIG. 1.
Figure 2A:
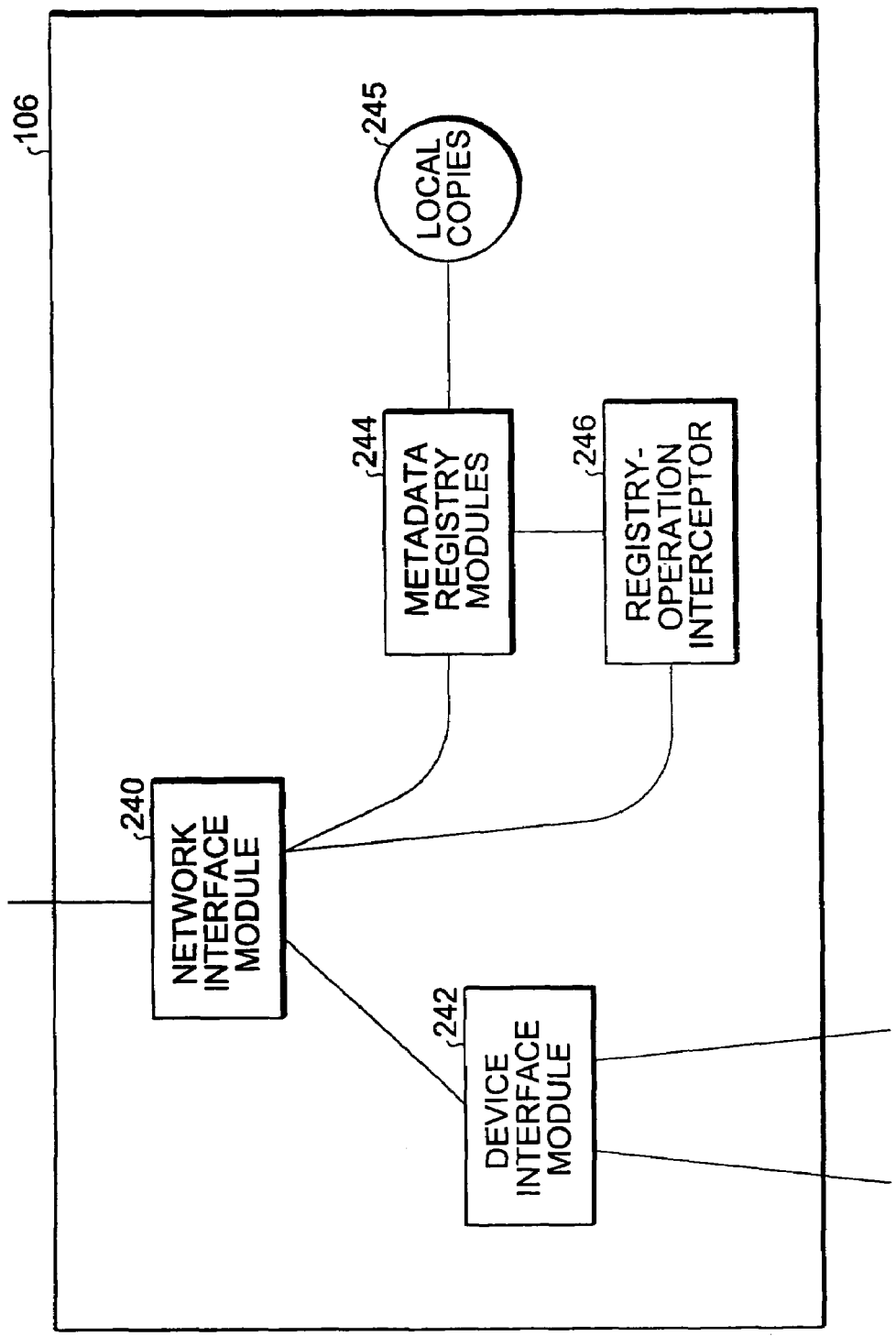
FIG. 2A, a block diagram illustrating processes and data on a storage machine from the distributed computing system of FIG. 1.

The compute machines 108 communicate through a network interface module 240 (FIG. 2A) executing on a storage machine 106 of the system to a device interface module 242. The compute machines also communicates with metadata registry modules 244 that exist on those of the storage machines having local copies 245 of portions of the metadata registry. Each storage machine also has a registration process that permits it to register its resources as available when the system is initialized. Storage machines having registry metadata modules 244 may have an intelligent registry-operation interceptor 246 that recognizes operations that may require updates to local copies 204 maintained on machines other than those initiating a transfer.

Switches of the system may have an intelligent registry-operation interceptor that recognizes operations that may require updates to local copies of the metadata registry maintained on machines other than those initiating and initially addressed by a transfer.

Figure 3:
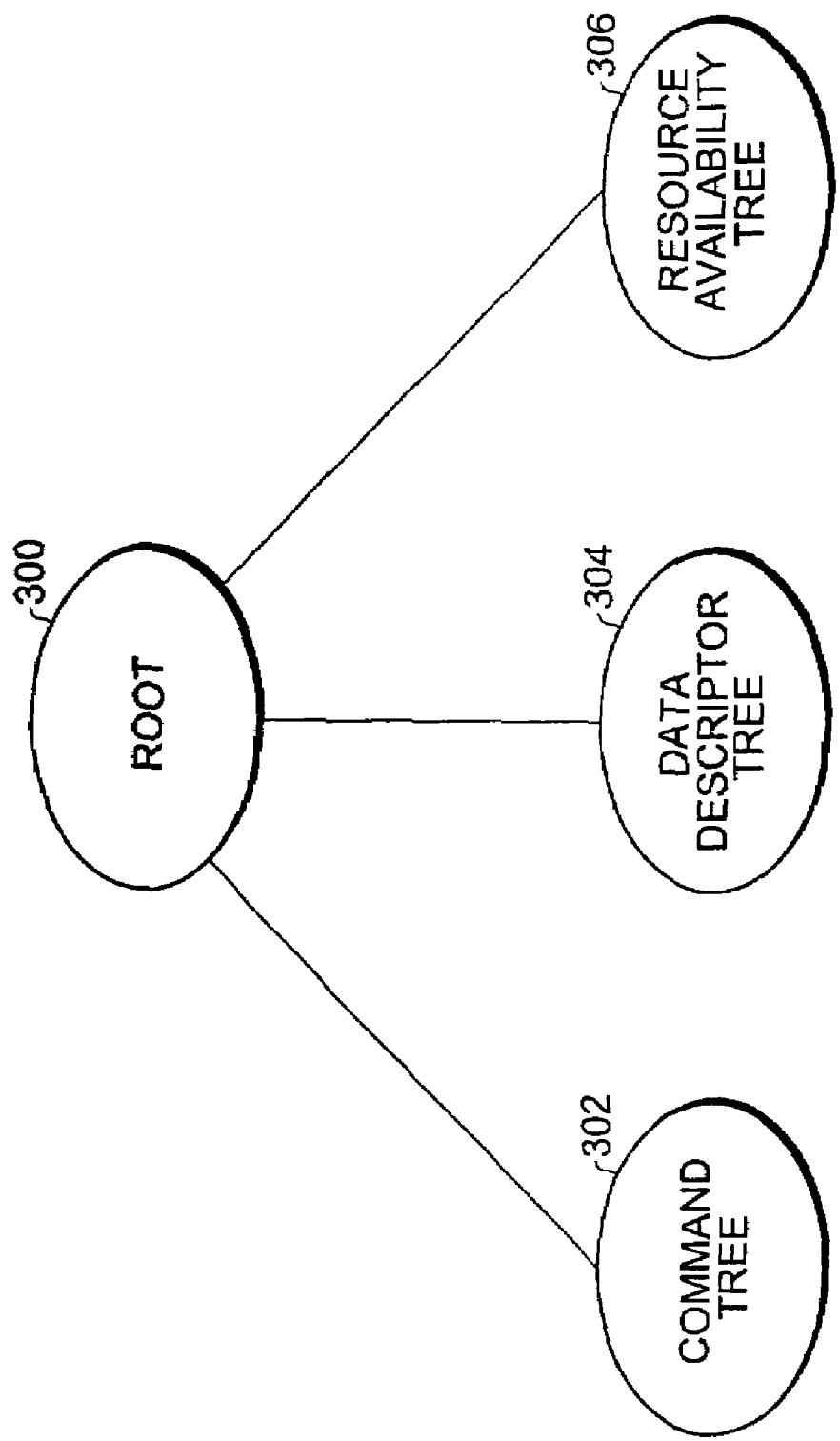
FIG. 3 an illustration of the structure of the registry, showing its command object, data location, and resource availability sections, and how these may be duplicated in part on multiple machines of the system.

The metadata registry of the system has a root 300 (FIG. 3) that is accessible in at least one location in the system. Links from the root may be traced to a pending command tree 302, a data descriptor tree 304, and a resource availability tree 306. Within the command tree 302 may be one or more command objects.

Figure 4:
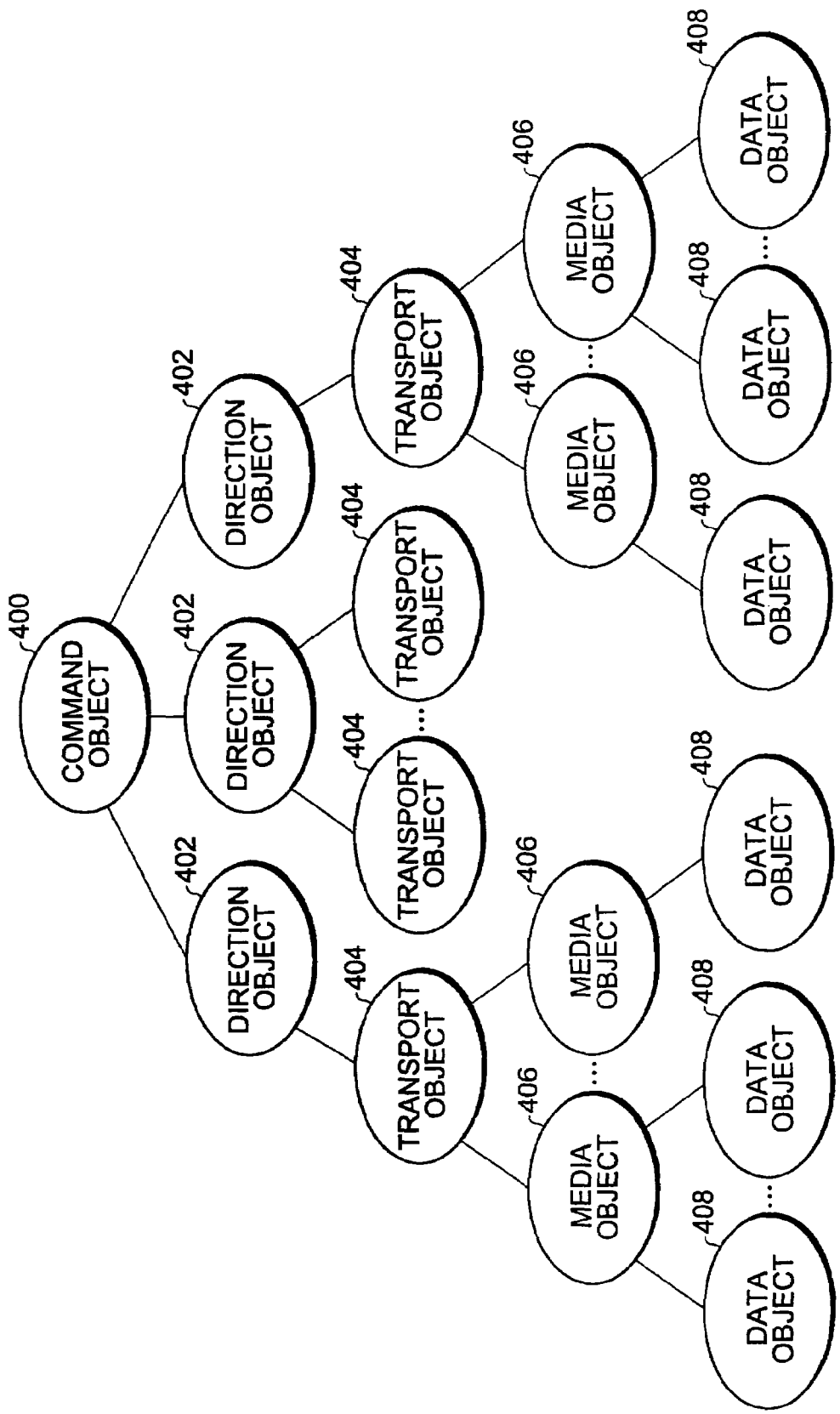
FIG. 4, an illustration of a command object of the registry.
Figure 5A:
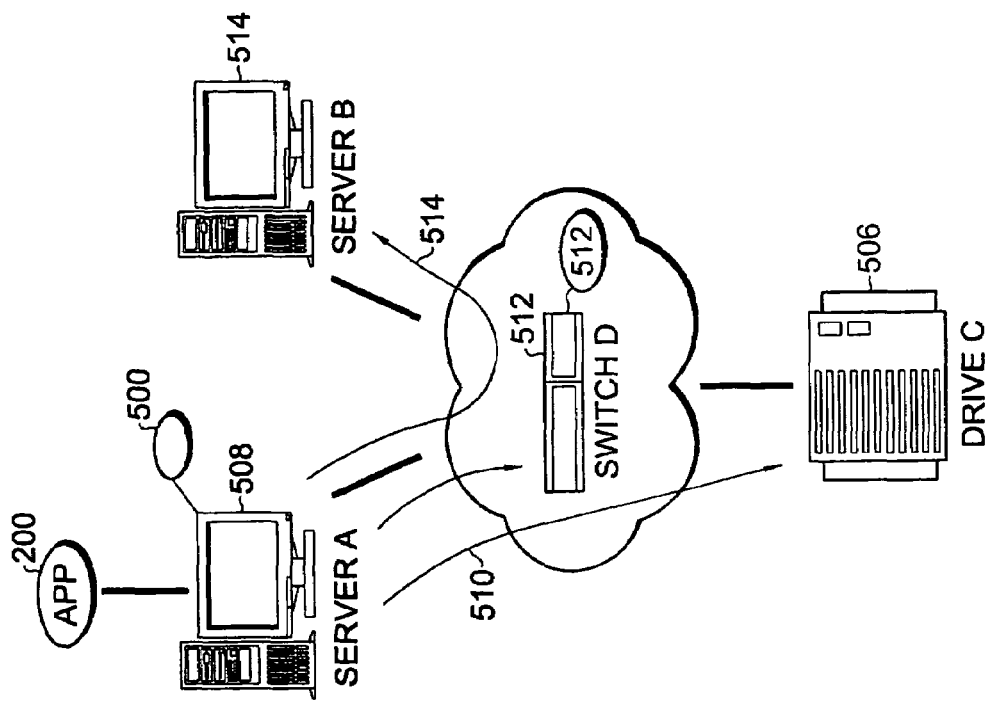
FIGS. 5, 5A, 5B, 5C, 5D, 5E, 5F, and 5G are illustrations of operations involving a write command object operative between machines of the system.
Figure 5:
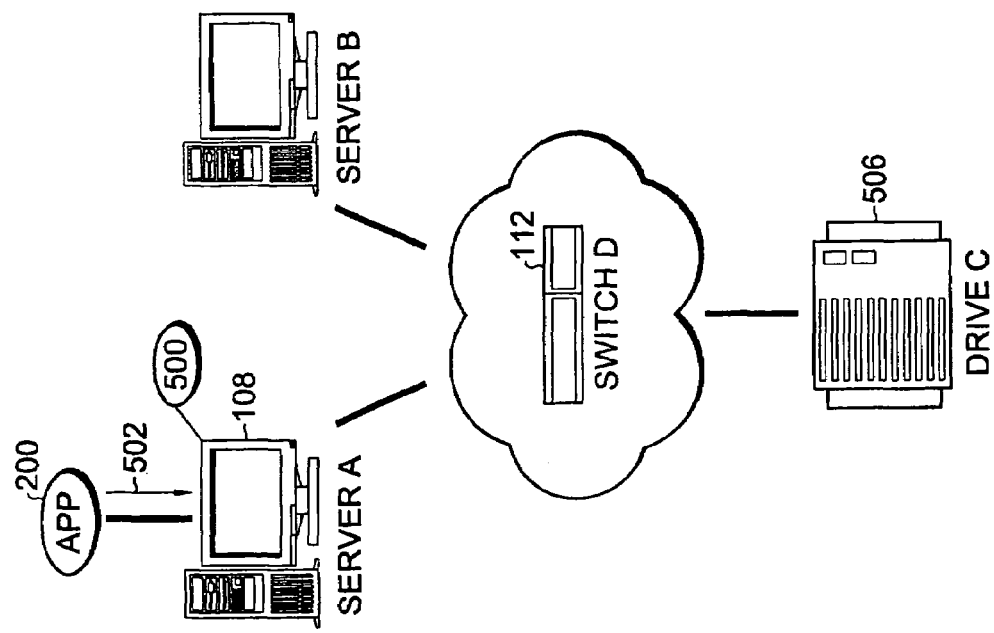
Figure 5C:
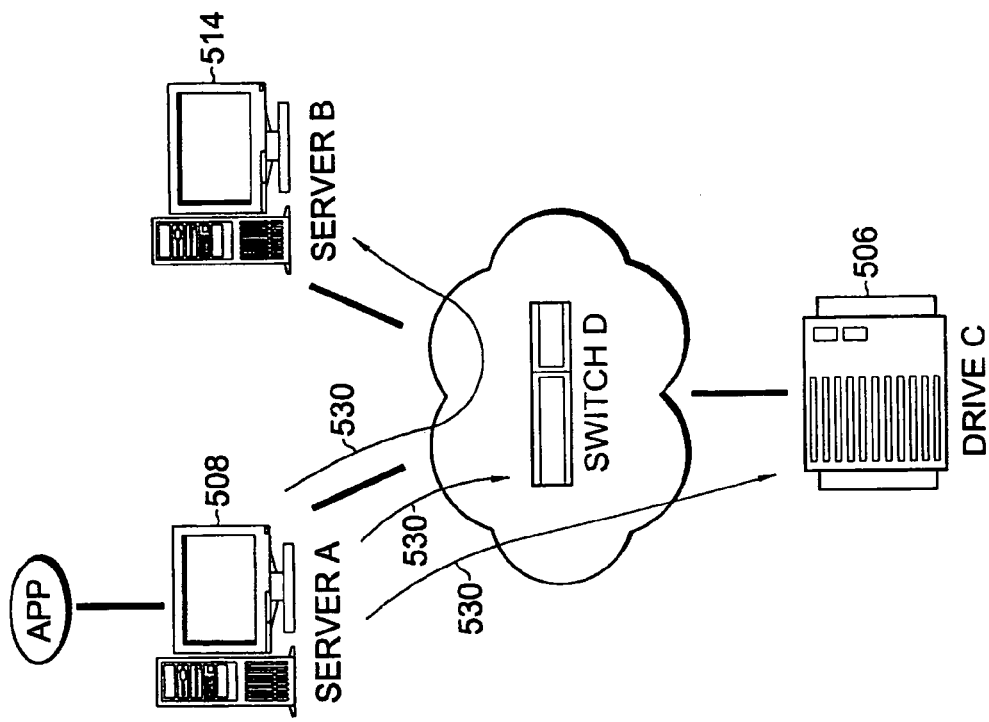
Figure 5B:
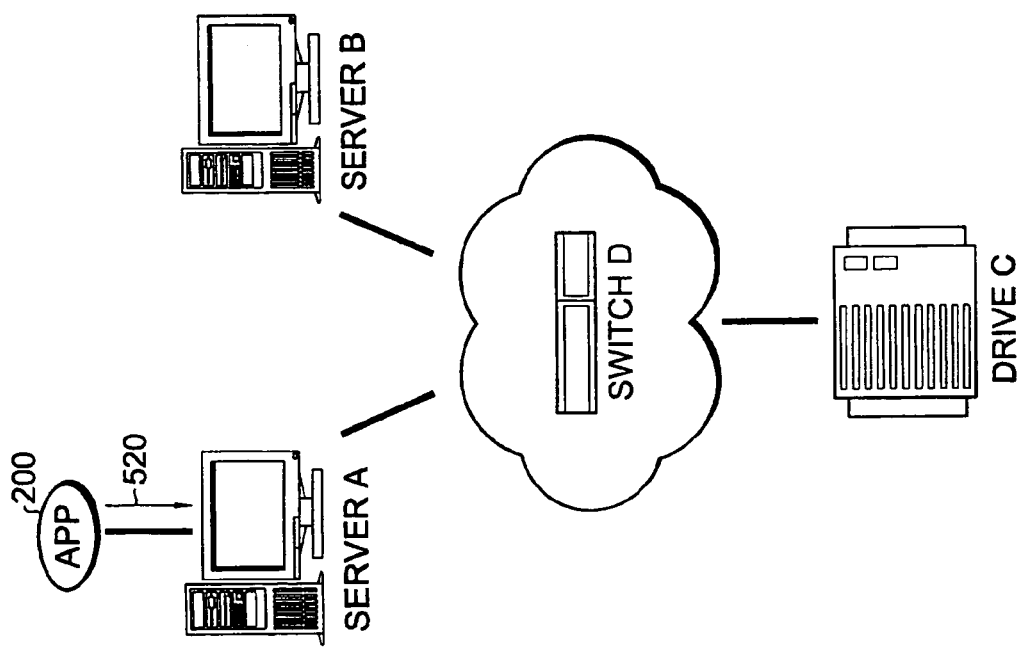
Figure 5E:
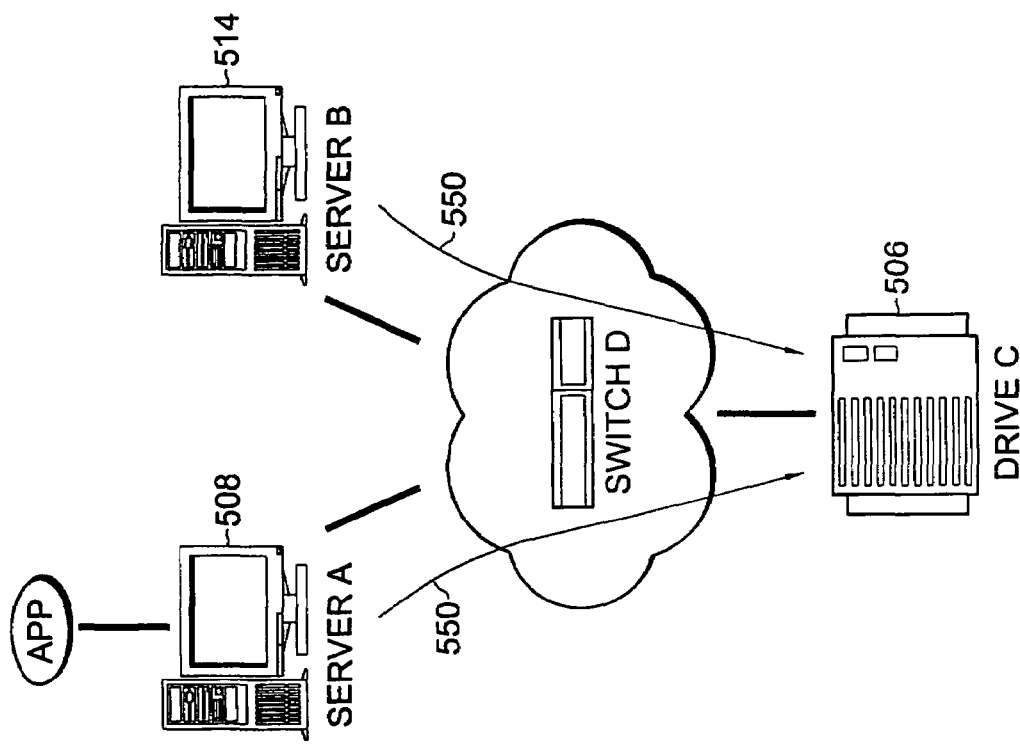
Figure 5D:
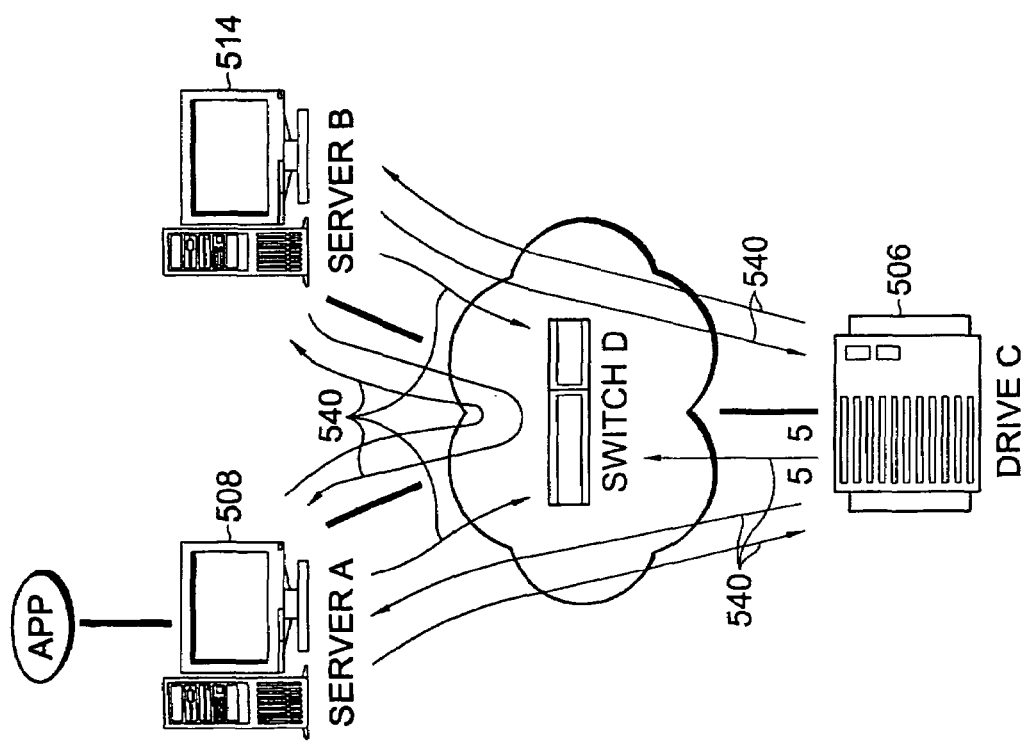
Figure 5G:
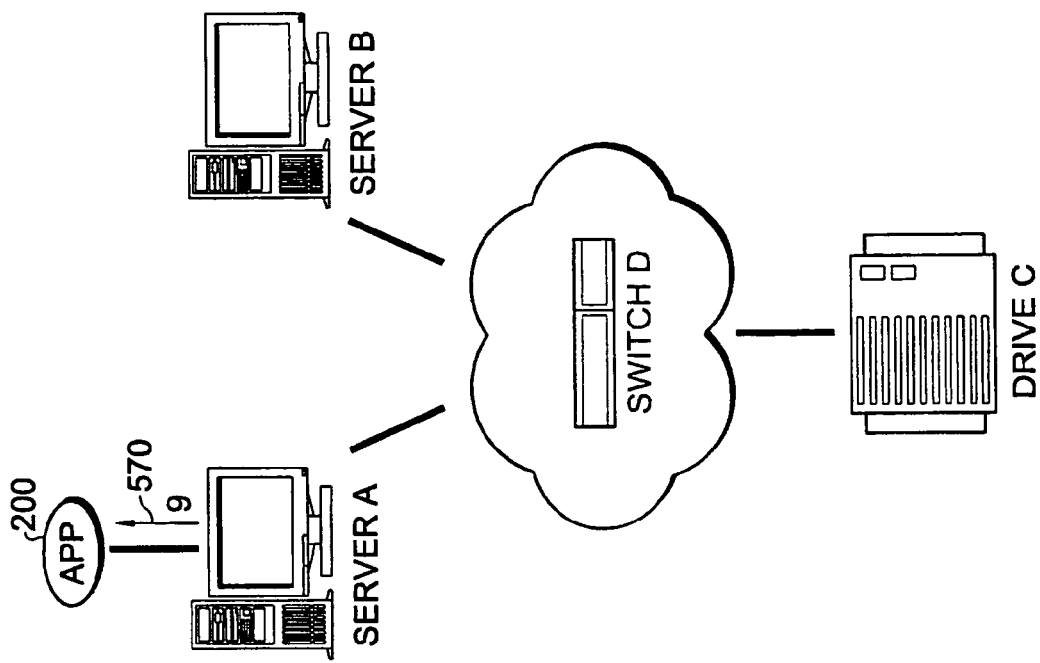
Figure 5F:
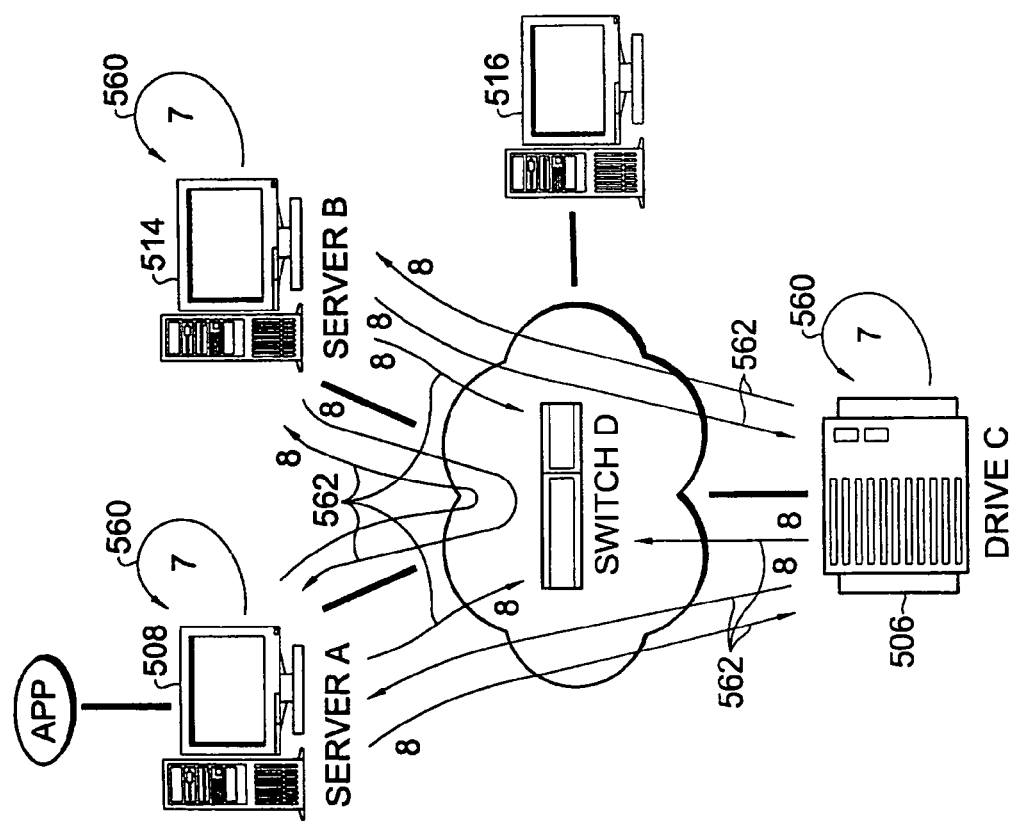

A command object of the metadata registry, as illustrated in FIG. 4, has a command object root 400. This command object root 400 links to direction objects 402 and transaction objects (not shown). The direction objects 402 link to transport objects 404, which may link through media objects 406 to data objects 408.

The metadata registry command object portion stores eleven or more types of objects, each having its own data structure having at least the following fields:

Command Object
Command Field
Link To Direction Object(s)
Link To Transaction Object(s)

where "Command Field" is a string comprising one of the I/O commands Store, Retrieve, Erase, and Execute. A Command Object is typically linked to at least two Direction Objects—a source and a destination—and at least one Transaction Object (multiple transactions may use the same Command Object).

Direction Object
Position Field (Source, Intermediary, Destination)
Link To Transport Object(s)
Link To Transaction Object(s)

where "Intermediary" is used if the Direction Object is an intermediate object through which the data must travel. A Direction Object typically has links to at least one Transport Object and at least one Transaction Object.

Transport Object
ID Field
Protocol Field
Link To Location Object(s)
Link To QOS Object(s)
Link To Media Object(s)
Link To Transaction Object(s)

where "ID Field" is the ID of the Transport Object (e.g. LAN_1), and "Protocol Field" specifies the protocol to be used (e.g., TCP/IP).

Media Object
ID Field
Size Field
Link To Location Object(s)
Link To QOS Object(s)
Link To Management Object(s)
Link To Data Object(s)
Link To Lock Object(s)
Link To Transaction Object(s)

where "ID field" is the ID of the Media Object (e.g., SEAGATE_DRV_01), and "Size Field" is the size of the Media Object (e.g., 18.1 GB). Note that the Media Object includes information about the machine on which the resource is located.

Data Object
ID Field
Sequence Number Field
Size Field
Position Field
Link To Location Object(s)
Link To QOS Object(s)
Link To Management Object(s)
Link To Lock Object(s)
Link To Transaction Object(s)
Link To Timing Object(s)

where "ID Field" is the ID of the Data Object, "Sequence Number Field" is a sequence number for the Data Object if it is one sequential portion of a larger data file, for example, "Size Field" is the size of the Data Object in bytes, and "Position Field" is the position of the Data Object in memory or storage.

Management Object
Ownership Field
Access Field
Security Field where "Ownership Field" identifies who owns a Media Object or Data Object, "Access Field" identifies who should have access, and "Security Field" identifies whether data to or from the Media Object or Data Object should be encrypted, compressed, etc.

Quality Of Service (QOS) Object
Bandwidth Field
Latency Field
Sequencing Properties Field (In-Order/Linear, Out-Of-Order/Random-Access)

where "Bandwidth Field" identifies the bandwidth required for a transaction, "Latency Field" identifies the latency permissible, and "Sequencing Properties Field" identifies whether data must be accessed sequentially or can be random.

Location Object
ID Field
Level Of Operations (Local, Wide Area, Regional, Global, etc.)

Lock Object
ID Field
Access Mask
Link To Timing Object(s)

where "Access Mask" is a field identifying whether an object is locked.

Timing Object
ID Field
Duration Field

Transaction Object
ID Field

A data transfer command object initially created by the API 202 running in a compute machine 108 when the API 202 is requested to initiate an operation by an application program. This object is created with a command object 400, direction objects 402, data objects 408, and other permissible object fields as needed to specify the operation as known to the application. Data movement properties are determined by the data structure. Destinations and sources for data can be explicitly specified or matched to specified parameters. The data object-media object connections can also serve to define the data element to be transferred. This allows for the use of multiple levels of operation to suit an application's or device's needs. Leaving out the data object connection to a media object (on the source side), for instance, would allow for the copying of an entire device. Similarly, multiple media objects may connect to a single data object—this would allow for data sets that span drives.

Figure 6:
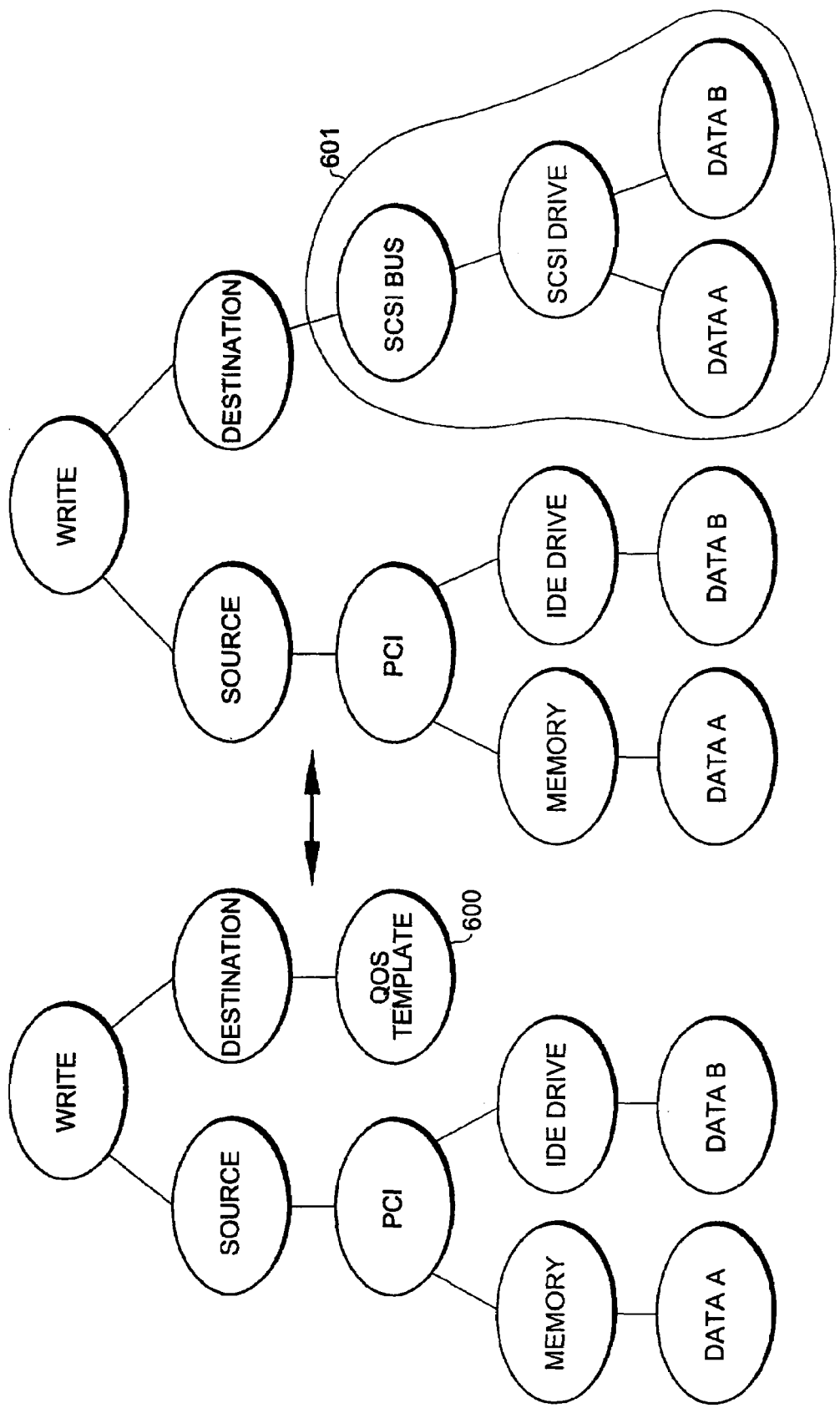
FIG. 6, an illustration of how an agent may intercept construction of a write command object and add additional destinations thereto.
Figure 7:
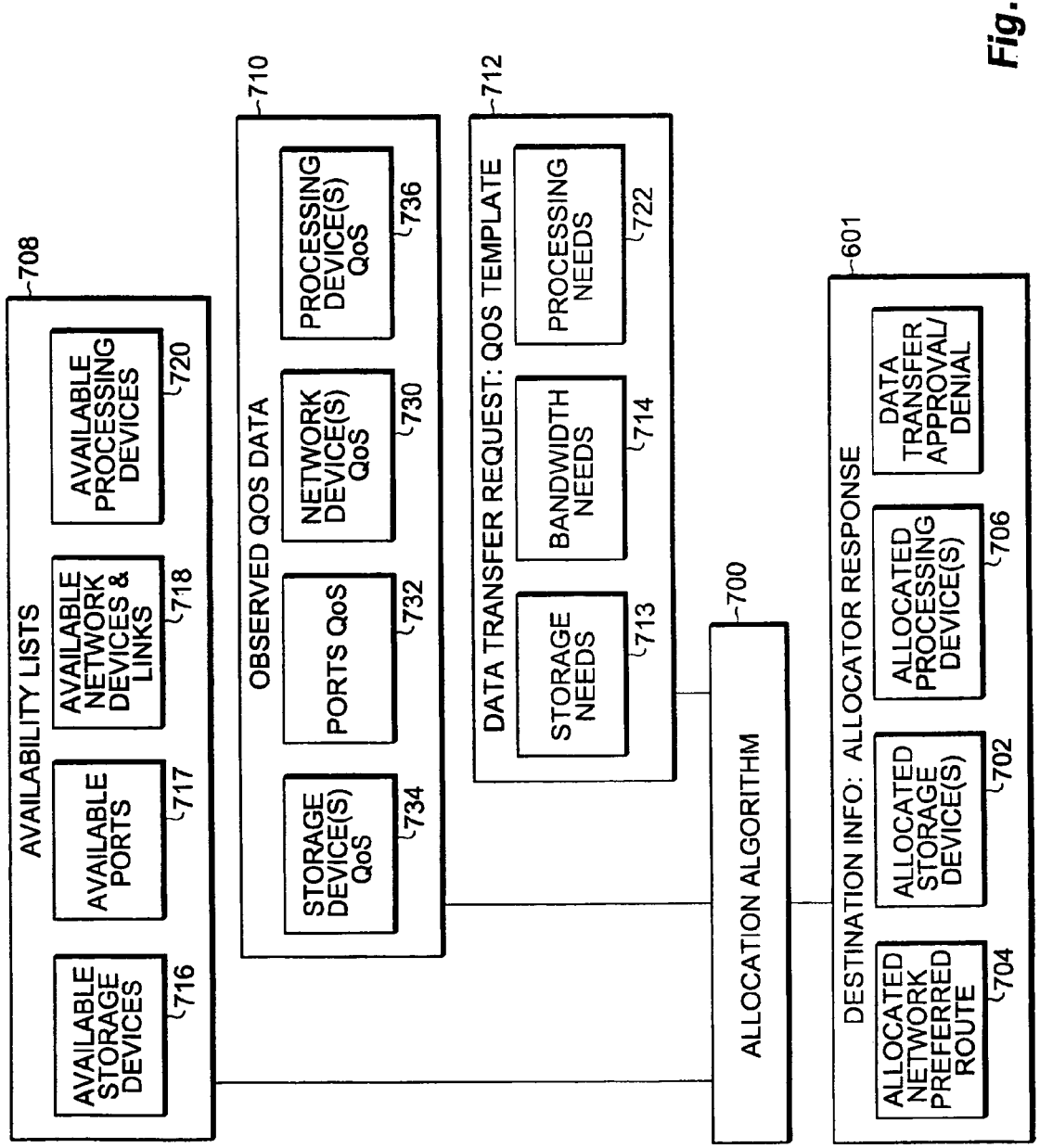
FIG. 7, a block diagram of resource allocation.

A QOS template 600 (FIG. 6) may be placed by an application or the API into creating the command object of FIG. 4. Before the command object is executed, the QOS template is replaced with detailed destination information 601 by a resource allocator 700, FIG. 7. In generating the destination information 601 (FIG. 6), which includes allocated storage device information 702, network port and switch preferred routing information 704, and, if requested, allocated processing device information 706, the resource allocator considers resource availability lists 708 and observed QOS data 710 as well as desired QOS information in the QOS template 712. The needed storage 713, including capacity and latency, is compared to that of the available devices 716 to determine those devices, or combinations of devices, that meet or exceed the requirements. Needed bandwidth 714 as specified in the QOS template 712 is compared to that of the available devices 716 and the available network ports 717 and network device and link capacity 718 of the network interconnect that connects the available devices to the machine originating the command object. Observed network device 730, port 732, storage device 734, and processing device 736 QOS information is also considered to avoid placement of high bandwidth data on resources that may have plenty of space, but which already have much of their bandwidth consumed by other tasks. The resource allocator 700 also considers the availability of processing devices 720 as compared to the processing needs 722 requested in the QOS template. The resource allocator may also set up alternate destination paths for overflow data should a device become full.

Users and application programs can fully specify destination and intermediary devices, such as switches, or they may let the system determine the optimal network path for the transfer.

FIGS. 5, 5A, 5B, 5C, 5D, 5E, 5F, and 5G illustrate operations involving a command object. Referring to these figures, as well as FIG. 2, the command object 500 is initially created by the API 202 (FIG. 2) upon request 502 of the application program 200 in the local copy 204 of portions of the metadata registry of the machine 110 originating the transfer.

This command object is forwarded 510 (FIG. 5A) from the compute machine 108 upon which it originates to other machines, such as storage machines 506 that participate in the transfer. While the object is being forwarded, it may pass through switches 112, where it is inspected by the intelligent registry-operation interceptor agent 512 to identify need for updates to local copies of metadata maintained on machines, such as machine 514, other than that initiating and already addressed by the object. Similarly, the object is inspected on arrival by any registry-operation interceptor of the target machines to identify need for updates to local copies of metadata maintained on machines other than that initiating and already addressed by the object. Should any such updates to local copies of metadata be required, the command object is modified by the agent 512 to include those local copies as additional destinations by adding additional direction objects 402, transport objects 404, and data objects 408 to it. The command object is forwarded 516 to these machines 514.

The command object 500 is transferred to all machines 506 and 514 participating in the transfer before the transfer is executed, but is not broadcast to machines not participating in the transfer. Once the expanded command object 500 is received by those machines, those machines may acknowledge receipt thereof. A transfer-initiation command is then requested 520 by the application 200 and broadcast 530 (FIG. 5C) to all participating devices, including all participating machines 508, 506, and 514; and the transfer is executed.

A ready to transfer response is next broadcast 540 (FIG. 5D) from each participating machine 508, 506, and 514 to each of the others. Data is then transferred 550 (FIG. 5E) as per the command. Each participating machine 508, 506, and 514 then updates 560 (FIG. 5F)its own copy of the distributed metadata registry indicating completion of the transfer. These changes are then broadcast 526 to other machines, including the participating machines 508, 506, and 514 as well as nonparticipating machines 516, having local copies of affected sections of the metadata registry. Once the originating machine 508 has received these changes from all the machines participating in the transfer, 506, and 514, it signals 570 completion to the application program 200.

The command object mechanism is used for commands affecting both data and metadata in the system. Command objects may reference and modify data objects that are of variable size—they need not reference complete files or individual or multiple disk blocks such as disk sectors or clusters. Executable code of the receiving machines translates the referenced data objects into a form suitable for the actual resources involved.

It is expected that some compute machines 108 may have some or all of the attributes and processes herein described concerning storage machines 106, and vice-versa. In particular, it is anticipated that storage machines may create command objects and thereby initiates transfers—this is of particular utility in performing backup and disk-imaging operations.

As has been seen, the registration process for data activity provides the information about which devices must be informed in order to maintain coherency. Coherency mechanisms to prevent problems that may occur in case of out-of-order delivery of metadata are provided. Coherency is automatically maintained on the Object Registry-level. Application programs, and the API, may optionally maintain coherency on data stored in the system.

Command objects may have an order-specific execution flag. In order to enforce coherency, command objects ready for execution are evaluated for potential dependencies and order-specific execution flags. Those without potential conflicts or order-specific execution flags, as well as those whose potential conflicts have cleared or are the earliest pending in order-specific sequences, are executed; with the remainder held for later execution. Command objects having incomplete potential dependencies may, but need not, be executed speculatively if the participating machines have sufficient capacity to do so.

Figure 8:
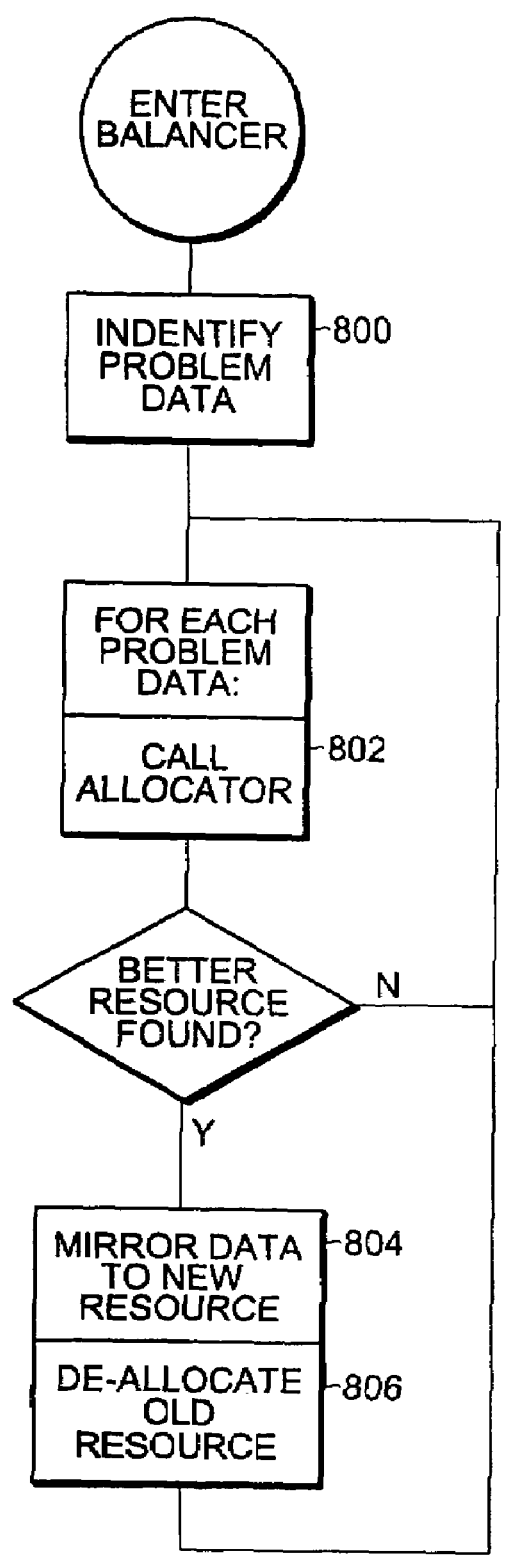
FIG. 8, a flowchart of load balancing.

Each machine having data monitors the actual quality of service it provides to user and application programs running in the system. There is a dynamic load-balancing process, FIG. 8, that periodically examines the metadata registry to identify problem data 800. Problem data is data for which the QOS requirements have not been met, for which the QOS requirements have been greatly exceeded, or that may soon overflow a resource. Priority is given to frequently accessed data for which QOS requirements are frequently missed. For each problem data, the balancer process calls 802 the allocator to check resource availability information of the metadata registry for more optimum location or locations. Consideration is given to the possibility of making resources of high QOS available for problem data by moving data for which the QOS requirements have been greatly exceeded or which is seldom accessed.

After identifying problem data and more optimum locations therefore, the load balancing process mirrors 804 that data to the more optimum locations in the network. More optimum locations may be on resources having greater capacity, lower latency, higher bandwidth, fewer hops to machines that frequently access the data, or greater available interconnect bandwidth to the machines that frequently access the data. Once the data is mirrored to the new resource, the resource that previously stored the data is de-allocated 806.

System management utilities may also examine and alter the QOS requirements for specific data of the system to permit optimization of problem user and application programs run in the system.

The combination of the automatic resource allocation process and the load-balancing process together provide a utility-style operation, where storage requests need not specify physical locations in the network.

In another embodiment of the invention, application-specific executable code, such as search code, may be transmitted through the command object to, and executed on, the machine or machines on which data is located. This is done by linking a code object into the command object. This application-specific executable code is useful for locating desired data or metadata of the system. If that machine already has the application-specific executable code, the receiving machine may delete the code object from the command object prior to command object execution; thereby suppressing transmission of the code. The application specific code may comprise encryption or decryption, sorting, or filtering code in addition to or instead of search code.

The application-specific executable code may be in a scripting language for interpretation, in a generic language to be compiled or interpreted by the machine on which it is to be executed, or may be in a precompiled binary format. Each resource having the ability to execute application-specific executable code has a descriptor in a media object of the metadata registry that states the form or forms of application-specific code that it supports. Either the QOS object or the media object of a command object can specify the form or forms of application-specific code required for a resource to be allocated by the resource allocator.

When the command object is executed, the application-specific executable code is then executed on the machines on which the information is or may be located; and those machines return appropriate responses. This minimizes data transfer over the network during search operations since it is not necessary to transmit the entire dataset to be searched to the machine on which the application runs.

Although this invention has been described with reference to particular embodiments, the invention is not limited to these described embodiments. Rather, the invention is limited only by the appended claims, which include within their scope all equivalent devices and methods that operate according to the principles of the invention as described.

We claim:

1. A computer system for operation in a network, the system comprising a storage system, a network interface, and a processor; the system containing a local copy of a portion of a distributed metadata registry, and an agent for monitoring communications between machines of the computer network and the computer system for communications relevant to a command object of the metadata registry, the agent being configured to modify the command object by adding thereto network address information of machines of the computer network that should participate in a communication affecting the metadata registry to maintain coherency of the metadata registry.

2. The computer system of claim 1, wherein the command object further comprises a quality of service object comprising a desired capacity, latency, and bandwidth, wherein the computer system comprises an allocator that selects a resource of the storage system according to criteria comprising the desired capacity, latency, and bandwidth of the quality of service object and available resource information of the metadata registry.

3. The computer system of claim 1, wherein the metadata registry comprises resource information including capacity and latency information for at least two devices to which the computer system is coupled.

4. The computer system of claim 1, wherein the command object comprises a quality of service object including a desired capacity, latency, and bandwidth.

5. The computer system of claim 1, wherein a resource allocator uses at least one of information in the quality of service object and resource information in the metadata registry to select a destination information.

6. The computer system of claim 1, wherein The metadata registry comprises network topology information, and the quality of service object comprises desired network hop information.

7. The computer system of claim 6, wherein the resource allocator uses the network topology information and the desired network hop information to select a resource.

8. The computer system of claim 1, wherein the metadata registry comprises network load information.

9. The computer system of claim 8, wherein the resource allocator uses network load information to select a resource.

10. The computer system of claim 1, wherein the metadata registry comprises information about processing resources of the network, and wherein the quality of service object comprises desired processing resources.

11. The computer system of claim 1, wherein the allocate or uses at least one of the information about processing resources of the network and the desired processing resources to select a resource.

* * * * *

UNITED STATES PATENT AND TRADEMARK OFFICE
CERTIFICATE OF CORRECTION

| | |
|---|---|
| PATENT NO. | : 7,379,960 B2 |
| APPLICATION NO. | : 10/748346 |
| DATED | : May 27, 2008 |
| INVENTOR(S) | : John Dimitroff et al. |

It is certified that error appears in the above-identified patent and that said Letters Patent is hereby corrected as shown below:

In column 11, line 17, in Claim 1, delete "computer system" and insert -- compute system --, therefor.

In column 11, line 25, in Claim 2, delete "quality of service" and insert -- quality-of-service --, therefor.

In column 11, line 30, in Claim 2, delete "quality of service" and insert -- quality-of-service --, therefor.

In column 12, line 6, in Claim 4, delete "quality of service" and insert -- quality-of-service --, therefor.

In column 12, lines 9-10, in Claim 5, delete "quality of service" and insert -- quality-of-service --, therefor.

In column 12, line 11, in Claim 5, after "select" delete "a".

In column 12, line 12, in Claim 6, after "wherein" delete "The" and insert -- the --, therefor.

In column 12, line 14, in Claim 6, delete "quality of service" and insert -- quality-of-service --, therefor.

In column 12, line 25, in Claim 10, delete "quality of service" and insert -- quality-of-service --, therefor.

UNITED STATES PATENT AND TRADEMARK OFFICE
CERTIFICATE OF CORRECTION

PATENT NO. : 7,379,960 B2
APPLICATION NO. : 10/748346
DATED : May 27, 2008
INVENTOR(S) : John Dimitroff et al.

It is certified that error appears in the above-identified patent and that said Letters Patent is hereby corrected as shown below:

In column 12, lines 27-28, in Claim 11, delete "allocate or" and insert -- allocator --, therefor.

Signed and Sealed this

Fifth Day of August, 2008

JON W. DUDAS
*Director of the United States Patent and Trademark Office*